Figure 5:
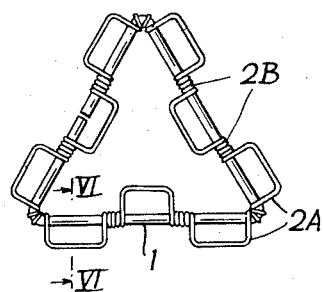

Jan. 17, 1961 S. C. W. WILKINSON 2,968,477
MECHANICAL, RESILIENT PRESSURE-APPLYING DEVICES
Filed Nov. 3, 1958 2 Sheets-Sheet 1
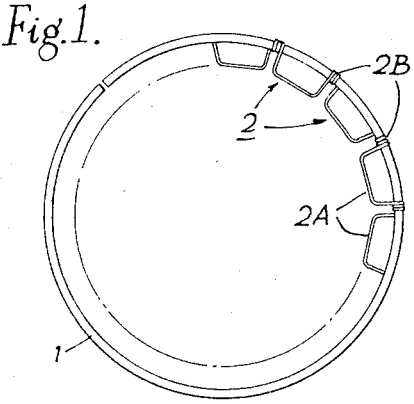
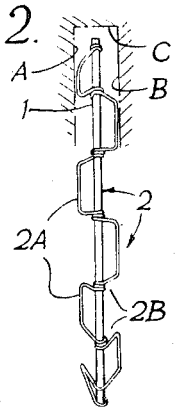
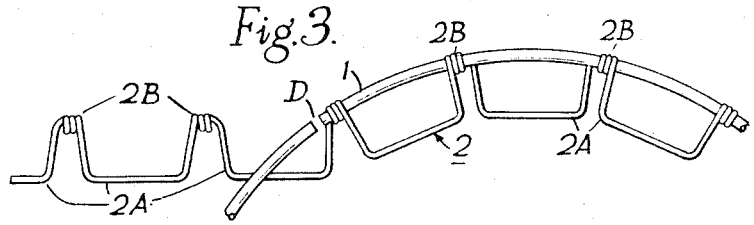
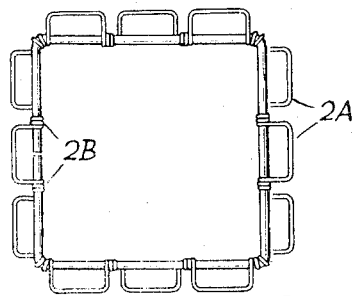
INVENTOR:
Samuel C.W. WILKINSON
BY:
Wenderoth, Lind & Ponack
ATTORNEYS Jan. 17, 1961  S. C. W. WILKINSON  2,968,477
MECHANICAL, RESILIENT PRESSURE-APPLYING DEVICES
Filed Nov. 3, 1958  2 Sheets-Sheet 2

INVENTOR:
Samuel C. W. WILKINSON
BY:
Wenderoth, Lind & Ponack
ATTORNEYS

United States Patent Office 2,968,477
Patented Jan. 17, 1961

2,968,477

MECHANICAL, RESILIENT PRESSURE-APPLYING DEVICES

Samuel Clifford Walter Wilkinson, Cookham Village, England, assignor to Crane Packing Limited, Buckinghamshire, England, a British company Filed Nov. 3, 1958, Ser. No. 771,334

Claims priority, application Great Britain Nov. 7, 1957

6 Claims. (Cl. 267—1)

This invention relates to mechanical resilient pressure-applying devices adapted for applying axial pressure over a substantial area.

One object of this invention is to provide such a pressure applying device which is constructed so as to be more or less self-adjusting as to the particular pressure applied in any given part of the area covered by the device.

Another object of the invention is to provide such a device which, whilst applying pressure over a substantial area, is nevertheless comparatively shallow and thus not likely to occupy more space, and in many cases likely to occupy less space, than that taken up by existing so-called Belleville washers or dished plate springs and wavy or circumferential corrugated springs.

Further objects of the invention are the provisions of such resilient pressure-applying devices in which, if desired, pressure is applied over a substantial radial depth and not simply along one circular pressure line, and such devices in which the pressure is not necessarily applied over a circular area.

One example of the use of an improved mechanical, resilient pressure-applying device is with a face-type mechanical seal as employed between relatively rotating members, such as a shaft and a pump housing or other structure, where hitherto it has often been necessary to make room for a large wavy or corrugated spring, or a Belleville washer or dished springy plate, a set of circumferentially spaced-apart compression springs or a known equivalent in order to provide correct seal-face loading characteristics throughout the wearing life of the sealing means employed. Even so many types of axial pressure springs (such as wavy or corrugated springs and Belleville washers) are not adapted to compensate automatically for varying conditions during operation. Another disadvantage of many existing spring means is that a large number of spring means must be made and stocked to cover the many different sizes of seals in use; this disadvantage may be avoided by a mechanical pressure device according to this invention.

In accordance with the present invention a mechanical resilient pressure-applying device comprises a carrier supporting at least one series of spring elements extending, usually on opposite sides of, and obliquely to the plane containing said carrier. Where the spring elements extend obliquely from both sides of the carrier, the latter may float approximately midway between opposing abutment surfaces with which resilient contact is made solely by the extending spring elements.

The carrier is conveniently of frame form, but is not necessarily a closed frame; that is, although the carrier member may be constituted, for example, of a length of wire bent into say a circular shape, the two ends of the bent wire need not be joined together. It is to be understood that the term "wire" as used herein is not to be interpreted as meaning essentially metallic wire; for instance plastic "wire" could be employed, particularly for the carrier. Metal wire covered with a plastic sheathing could also be used in some cases.

Generally and certainly in the case of a resilient pressure device for use with a face-type mechanical shaft seal, the frame-like carrier would almost invariably be of circular ring form, but this particular shape is not essential. Where pressure is to be applied over a circular band-like area of appreciable radial depth, or even over the whole of a circular or other shaped area, the carrier member may be constituted by a length of wire coiled spirally. Alternately a length of wire bent to zig-zag or grid form could form the carrier member.

In some cases, the final shape may be imparted to the carrier by bending after the spring elements have been mounted thereon.

The spring elements are conveniently constituted of U-shaped loops of wire which form the extending contact portions and of coiled portions which enclose a carrier made of wire bent into frame form or otherwise suitably mounted on a carrier or any other form. Preferably the U-shaped loops of the spring elements would extend obliquely from the carrier member in alternation and these alternately extending loops would be joined by a common interposed coil embracing the frame-like carrier member, so that the tendency of one loop to torsion said coil by twisting it in one direction would be opposed by a similar tendency on the part of an adjacent loop to twist the coil in the opposite direction. The alternate spring loops thus act in the main independently of one another and are accordingly self-adjusting to that extent; the appropriate local pressure is thus applied to the seal through any given spring loop.

Figure 6:
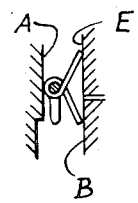

By way of example some embodiments of the invention will now be described with reference to the accompanying drawings, wherein:

Figures 1 and 2 are a front view and side view respectively of a spring pressure device of circular frame or ring form, and Figure 3 is an enlarged front view of a fragment thereof, Figure 4 is a front view of a spring pressure device using a square frame carrier and illustrating a second mode of arranging the spring elements, Figure 5 is a front view of a spring pressure device using a triangular frame carrier and illustrating a third mode of arranging the spring elements, and Figure 6 is a fragmentary cross section on line VI—VI of Figure 5.

Figure 7:
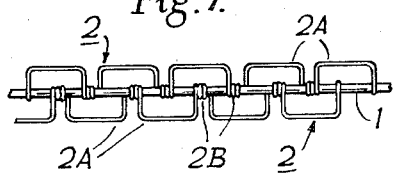
Figure 8:
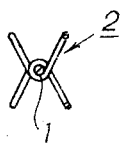

Figures 7 and 8 are respectively a fragmentary front view of, and a cross section through part of a carrier of rod form, illustrating a fourth mode of arranging the spring elements.

In the embodiment illustrated in Figures 1, 2 and 3 the carrier 1 is a circular frame constituted by a length of wire bent round to form a ring; the opposite ends of the ring-forming wire may be left unconnected, in end-to-end abutment or separated by a gap, or may be connected together in any suitable manner, as by welding, brazing, or soldering or secured by riveting, looping or any other mode of fastening.

The spring elements 2 are joined together and comprise U-shaped loops 2A alternating with close coiled portions 2B, consisting of at least one convolution of wire so that each loop with its adjacent coiled portions constitutes in effect what is commonly known as a rat-trap spring. Alternate loops 2A extend obliquely from opposite sides of the carrier 1 and in this partciular embodiment all the loops are directly inwards with respect to the carrier 1. As the loops are directed inwards with respect to the periphery of the carrier and obliquely away from the plane containing the carrier the latter is held in a floating condition between opposed abutment surfaces A, B with which the spring loops 2A alone make contact, and also if desired within a space bounded by a perimetral wall C which is not much larger in size than the carrier itself.

It will be readily understood that the spring elements may be made as a continuous string, a length of said string of elements equal to the circumferential length of the carrier 1 being cut off as required; the wire forming the carrier frame may be readily slipped into the coils 2B of a spring element string by reason of a gap D left between opposing ends of said wire (see Figure 3).

In some cases the spring element string may be threaded onto a substantially straight length of wire or rod which is subsequently bent to the required final shape, or alternatively after threading the spring element string onto a formed shape, such as the circular ring frame of Figure 1, or a square or triangular frame as shown in Figures 4 and 5 respectively, the required final shape may be imparted to the frame, for instance a circular frame may be deformed into elliptical or into figure-eight shape.

Figure 4 serves also to illustrate another mode of arranging the spring loops 2A, that is, all extending out from the carrier 1.

In the third example, which is illustrated in Figures 5 and 6, alternate loops 2A are directed inwards and outwards—an arrangement which may apply to the forms shown in Figures 1 and 4—but whereas in Figures 1 and 4, the loops extend alternately and obliquely on opposite sides of the carrier 1, in the loop arrangement shown in Figures 5 and 6 all loops extend on one side only of the carrier 1. One of the advantages of using alternate inwardly and outwardly directed loops is that the former may press against one abutment surface B and the latter against another adjacent surface E, and the spring loops may adjust themselves to any axial shifting of said surfaces. In the particular form shown in Figures 5 and 6 the coils 2A press against abutment surface A, so that the carrier 1 still floats between surfaces A and B, E.

Figures 7 and 8 show another arrangement in which use is made of two sets or series of spring elements supported on a common carrier 1, each set or series of spring elements being made, as already described, from a single length of spring wire. The U-loops 2A and coils 2B made from one length of wire alternating with those made from the other length of wire.

I claim:

1. A mechanical resilient pressure-applying device comprising a flat carrier of closed frame form made of wire and a length of wire formed into spring elements constituted by a series of loops extending out at opposite sides of said carrier in positions non-perpendicular to the plane containing said carrier and of coiled portions interposed between and joining together adjacent loops, each coiled portion comprising at least one convolution embracing the wire forming said carrier, the perimetral extent to the loops extending on one side of said carrier being substantially equal to that of the loops extending on the other side of the carrier.

2. A mechanical device for exerting resilient axial pressure, comprising a single carrier and two sets of interconnected spring elements, each set of spring elements consisting of coils encircling a limb of said carrier and of substantially U-shaped loops joined to said coils by the inner ends of the sides of the U loops, alternate loops extending obliquely from the plane containing said wire carrier so that only the bend portions of the spring loops contact with abutment surfaces between which the device is interposed, and said two sets of spring elements being mounted on the single carrier with the coils of one set of spring elements alternating with the coils of the other set of spring elements.

3. A mechanical resilient pressure-applying device comprising a flat carrier of closed frame form made of wire and two lengths of wire formed into spring elements constituted by a series of loops extending out at opposite sides of said carrier in positions non-perpendicular to the plane containing said carrier and of coiled portions interposed between and joining together adjacent loops, each coiled portion comprising at least one convolution embracing the wire forming said carrier, and the perimetral extent of the loops extending on one side of said carrier being substantially equal to that of the loops extending on the other side of the carrier, both spring forming wires being supported by the same carrier with the coiled portions made from one length of wire alternating with those made from the other length of wire.

4. A resilient pressure-applying device according to claim 1, in which all the spring elements extend from the carrier in inward directions.

5. A resilient pressure-applying device according to claim 1, in which all the spring elements extend from the carrier in outward directions.

6. A resilient pressure-applying device according to claim 3, in which substantially half of the perimetral extent of the loops is composed of loops which are directed inwards of the carrier, the other loops being directed outwards.

References Cited in the file of this patent

UNITED STATES PATENTS

| | | |
|---|---|---|
| 388,160 | Torley | Aug. 21, 1888 |
| 1,589,381 | Worester | June 22, 1926 |
| 2,564,570 | Hatfield | Aug. 14, 1951 |
| 2,750,185 | Moore | June 12, 1956 |
| 2,822,677 | Reynolds | Feb. 11, 1958 |

FOREIGN PATENTS

| | | |
|---|---|---|
| 135,218 | Germany | Nov. 6, 1902 |
| 264,757 | Great Britain | Jan. 27, 1927 |
| 1,063,799 | France | Dec. 16, 1953 |